United States Patent [19]

Fathergill et al.

[11] 4,219,823

[45] Aug. 26, 1980

[54] IMAGE INCLINATION CONTROL FOR BI-DIRECTIONAL INK JET PRINTERS

[75] Inventors: Rex D. Fathergill, Frankfort; Alvin L. Wittwer, Paris, both of Ky.

[73] Assignee: International Business Machines Corp., Armonk, N.Y.

[21] Appl. No.: 75,911

[22] Filed: Sep. 17, 1979

[51] Int. Cl.³ .............................................. G01D 15/18

[52] U.S. Cl. .................................. 346/75; 346/140 R

[58] Field of Search .......................................... 346/75

[56] References Cited

U.S. PATENT DOCUMENTS

| | | | |
|---|---|---|---|
| 3,895,386 | 7/1975 | Keur et al. | 346/75 X |
| 3,938,163 | 2/1976 | Fujimoto et al. | 346/75 |
| 4,075,636 | 2/1978 | Galetto et al. | 346/75 |
| 4,138,688 | 2/1979 | Heard et al. | 346/75 |
| 4,167,741 | 9/1979 | Heard et al. | 346/75 |

*Primary Examiner*—George H. Miller, Jr.
*Attorney, Agent, or Firm*—William J. Dick

[57] ABSTRACT

In a continuous type ink jet printer having a conventional charging electrode for charging ink drops in accordance with a signal to be recorded on a record receiving medium, at least one, and preferably both of the deflection electrodes is mounted so that the deflection electrodes may be positioned in a first position by an actuator to allow for printing in a first direction. The actuator tilts the electric field to compensate for character inclination during carrier movement, and at the opposite end of the print line rotates the deflection electrodes to a second position to incline the electric field to compensate, during carrier movement in that opposite direction, for character inclination due to carrier movement in the second direction.

14 Claims, 5 Drawing Figures

IMAGE INCLINATION CONTROL FOR BI-DIRECTIONAL INK JET PRINTERS

CROSS REFERENCE TO RELATED APPLICATION

See "Inertial Deflection Field Tilting for Bi-Directional Printing in Ink Jet Printers," Ser. No. 76,040 of Denny et al, filed concurrently herewith.

SUMMARY OF THE INVENTION AND STATE OF THE PRIOR ART

The present invention relates to ink jet printers and more specifically relates to a continuous type ink jet printer having apparatus for controlling the inclination of the printing of images (characters, patterns etc.) by the ink jet printer.

A typical charge amplitude controlled continuous type ink jet printer is the IBM 6640 document printer which employs a single nozzle. In this type of printer, deflection of a charged ink drop in the vertical direction of the dot pattern is accomplished by controlling the charge amplitude on individual ink drops so as to produce differences in the amount of deflection between the ink drops as they pass between a pair of deflection electrodes. Deflection in the horizontal direction, however, is produced by movement of the carrier, the carrier having mounted thereon the nozzle for emitting a stream of ink drops, the charging electrode for charging the ink drops in accordance with the signals to be recorded, and the deflection electrodes.

In the aforementioned document printer, the ink drops are scanned in a vertical direction, in the example instance from their lowest to their highest printing position. When a white space is to be left without an ink drop thereon, the ink drops are left uncharged or receive a minimal charge and are propelled towards a gutter for recirculation back to the ink supply system. As the raster in the ink jet printing machine progresses from its lowest to highest deflected printing position, the carrier moves from left to right so that the raster slants in the direction of carrier motion. In the IBM 6640 document printer, the effect is nominally 0.00417 inches (0.106 mm) on a vertical distance of 0.167 inches (4.24 mm), or 1.43°. In the example printer, the slant is eliminated by tilting the deflection plate assembly by 1.43° in the opposite direction.

Of course if it is desired to print from right to left, without slant correction, the slope of the characters being printed would appear at double the magnitude inasmuch as the deflection electrodes are tilted in the wrong direction.

Other approaches may rely on the fact that the charge on a drop is roughly proportional to its height in the raster. Therefore, introduction of a second set of deflection electrodes with a horizontally disposed electric field therebetween may be employed to provide raster tilt. Such a system is described in U.S. Pat. No. 3,938,163. Compared to the primary deflection electrodes, the needed deflection in the horizontal direction is only about 2.5% , the length of the throw from the mid-point of the deflector being about twice as far from the page, and the deflector electrodes can be much closer together since deflection within them is quite small. For example, at a 0.030 inch (0.762 mm) spacing, a 0.010 inch (0.254 mm) length, and a 125 volt supply may be sufficient for a system such as the IBM 6640 document printer, thus making it feasible to electronically switch horizontal deflection voltage during carrier turnaround. However, even the 0.254 mm added to the length of throw (throw is defined as the distance that the drop must travel from the nozzle to the paper) increases the already difficult ink drop merge and scatter problem.

In patent application Ser. No. 864,068 to R. S. Heard and D. W. Phillips, filed on Dec. 23, 1977, and entitled "Raster Slant Control In An Ink Jet Printer," (now U.S. Pat. No. 4,167,741, issued on Sept. 11, 1979) means of varying the ink drop pattern inclination by distortion of the electric field is described. In U.S. Pat. No. 4,138,688 is disclosed a method and apparatus for automatically controlling the inclination of patterns in ink jet printers by monitoring the carrier velocity and automatically feeding back a signal to an electric field distortion created by a voltage difference on the deflection electrodes to control the electric field dependent upon carrier velocity. In U.S. Pat. No. 3,895,386 issued on July 15, 1975, is disclosed the basic principle of off-setting one charge electrode with respect to the other charge electrode to effect an inclination or curving of the electric field formed between the electrodes, or in the alternative of skewing one of the electrodes relative to the second electrode to also effect an inclination of the electric field in order to compensate for the tilt.

In view of the above, it is a principle object of the present invention to provide actuator means connected in such a manner as to alter the physical position of at least one deflection electrode so as to compensate, regardless of the direction of relative movement between the carrier and the record receiving media, for the tilt of the image being printed due to the horizontal velocity of the carrier in an ink jet printer and in conjunction with the vertical raster scan.

Another object of the present invention is to provide apparatus in an ink jet printer which permits of highlighting or italicizing print by deliberately tilting characters or images.

Other objects and more complete understanding of the invention may be had by referring to the following specification and claims taken in conjunction with the accompanying drawings.

DRAWINGS DESCRIPTION

Figure 1:
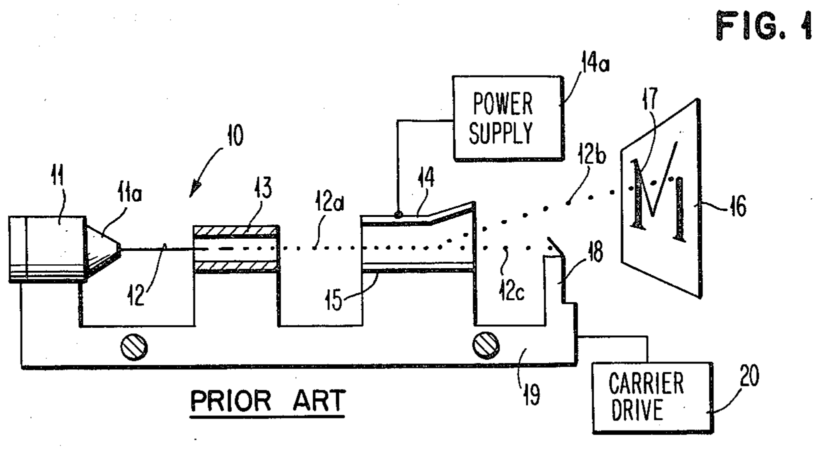
FIG. 1 is a fragmentary schematic view of a typical continuous, charge amplitude control type ink jet printer.

Referring now to the drawings, and especially FIG. 1 thereof, a typical ink jet printer 10 of the charge amplitude or continuous type is illustrated schematically therein. The printer comprises a drop generator or the like 11 to which is supplied ink as from an ink supply.

The drop generator is vibrated in the conventional manner as by a piezoelectric crystal which is driven from a crystal driver such that ink is dispelled from a nozzle 11*a* in a stream 12. The stream breaks up within a predetermined distance from the nozzle in a charge electrode or ring 13, the ink drops 12*a* which form from the stream, being charged by the charging electrode in accordance with signals representative of image or character data to be printed. Ink drop 12*a* then pass intermediate first and second deflection electrodes 14 and 15 respectively, between which electrodes is an electric field formed by a power supply 14*a* so that the drops are deflected, for example, along the path 12*b*. The deflected height of the drops is of course dependent upon the amplitude of the charges on the drops. The droplets impinge upon a record receiving means 16 for forming patterns such as images, characters etc., in the present instance the letter "M" 17 being illustrated on the record receiving means 16. Typically, blank spaces in the amplitude control type ink jet printer are afforded by placing a low charge or no charge on the drops as they are formed within the charging electrode 13, these drops passing between the deflection plates 14 and 15 along path 12*c* where they impinge upon a gutter or the like 18 which allows ink to be recirculated back through an ink supply system (not shown) to the drop generator 11.

The drop generator (including the nozzle 11*a*) as well as the charging electrode 13, deflection electrodes 14 and 15 and gutter 18 are mounted on a carrier 19 which is driven as by carrier drive means 20 to effect horizontal movement of the ink drop stream relative to the record receiving means 16, in the instance of FIG. 1 the carrier moves into and out of the plane of the drawing.

In accordance with the invention, means are provided for controllably setting the tilt of the electric field between the deflection electrodes 14 and 15 to not only compensate for the tilt of the character or images formed on the record receiving means, but to create, when desired, a tilt to the characters, for example for highlighting or the like. To this end, and referring now to FIG. 2, at least one, in the preferred embodiment both of the deflection electrodes are mounted for actuable rotation for altering their physical position to thereby alter the inclination of the electric field between the electrodes. As shown, the electrodes 14 and 15 are preferably mounted in and connected to an insulating or dielectric ring member 21 which is captured between upper and lower bearing blocks 22 and 23 respectively and mounted for rotation therebetween. The bearing blocks 22 and 23 are fitted in a frame 24 including a base portion 25 and upstanding wall portions 26*a*, 26*b*. In its preferred embodiment, the axis of rotation of the ring 21 is about the center of the nozzle 11*a* and charge electrode 13, or for practical purposes about the undeflected stream of ink drops 12*c* (gutter drops).

Figure 2:
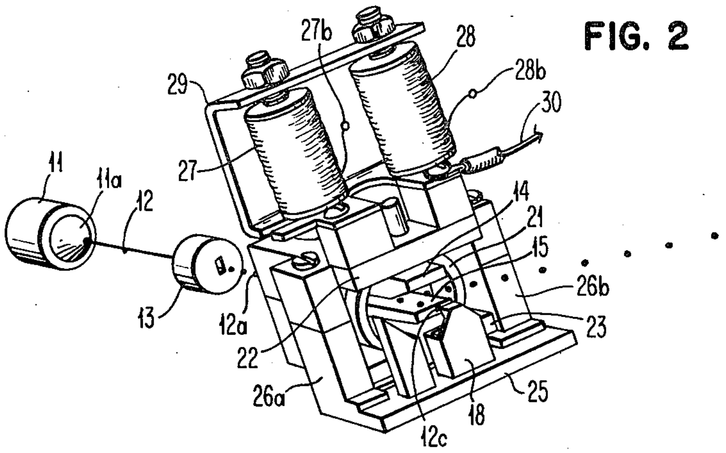
PRIOR ART FIG. 2
FIG. 2 is a fragmentary perspective view of a modified deflection electrode apparatus constructed in accordance with the present invention.
Figure 3:
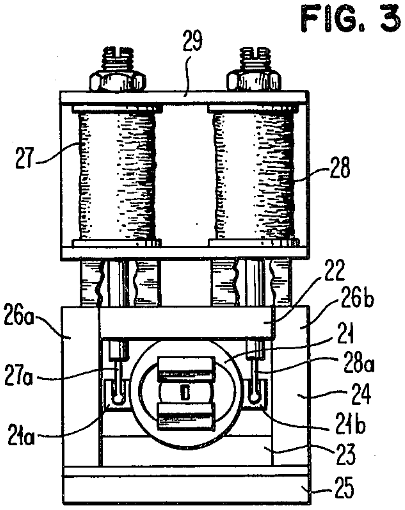
FIG. 3 is a fragmentary front elevational view of apparatus constructed in accordance with the present invention and illustrated in FIG. 2.
Figure 4:
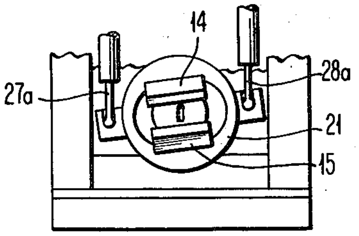
FIG. 4 is a view similar to FIG. 3 except fragmented to more clearly show the position of the deflection electrodes in a first position for printing in a first direction and as viewed from the print receiving medium.
Figure 5:
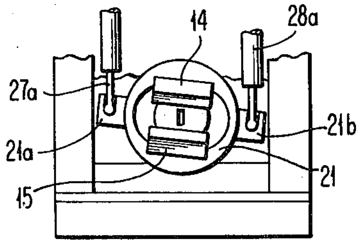
FIG. 5 is a view similar to FIG. 4 but illustrating the deflection electrodes in a second position for printing in the reverese direction.

In order to effect rotation of the ring 21 and thereby tilt the electric field formed between the deflection electrodes 14 and 15, as illustrated in FIGS. 2 and 3, actuator means, in the present instance electro-mechanical transducer means, such as solenoid actuators 27 and 28 having plungers 27*a* and 28*a* which extend through the upper support block 22, are connected to ears 21*a*, 21*b* associated with the ring 21. Typically, the connecting arrangement may be ball and socket in design (as best shown in FIGS. 3-5) to permit of rotation of the ring 21 without binding against the rods 27*a*, 27*b*. The solenoids are preferably connected to the upper bearing support 22 as by frame member 29 and may be energized as through leads 27*b*, 28*b* respectively (lead 30 being a ground connection).

As best illustrated in FIGS. 4 and 5, the mounting ring 21 and thus the deflection electrodes 14 and 15 are movable by the actuator means (solenoids 27 and 28) between a first position such as illustrated in FIG. 4 which is conventional for right to left movement, and the second position shown in FIG. 5 where the deflection electrodes are tilted for left to right character or image printing.

Actuation or energization of the actuator means may be accomplished by energizing the leads 27*b*, for example, when printing from right to left, while energization of the solenoid 28 may be by energization of the lead 28*b* when printing from left to right. Moreover, the tilt may be altered any time during the print line merely by energization of the opposite solenoid so that an italicized print may be accomplished, for example, for highlighting or the like.

Energization may be accomplished in any convenient manner. For example, in the IBM 6640 ink jet printer, switches are connected to the frame at opposite ends of the carrier travel to give an electrical output indicative of the "end-of-travel" position of the carrier. The output of these switches may be employed to energize one or the other of the solenoids. Moreover, if the printer is operated interactively, a keyboard switch may be employed to shift from one solenoid actuation to the other by the operator for charging the electric field tilt for highlighting purposes.

Accordingly, the present invention provides apparatus which is simple in nature but which may be employed to control the inclination of patterns or images in an ink jet printer by rotation of at least one, in the present instance and in the preferred embodiment, both of the deflection electrodes.

Although the invention has been described with a certain degree of particularity it is understood that the present disclosure has been made only by way of example and that numerous changes in the details of construction, the combination and arrangement of parts, and the method of operation may be made without departing from the spirit and scope of the invention as hereinafter claimed.

What is claimed is:

1. In an ink jet printer comprising:

a nozzle for emitting a stream of ink drops at a predetermined velocity in a predetermined path;

a charging electrode for charging the ink drops in accordance with the signals to be recorded;

first and second spaced apart deflection electrodes on opposide sides of the path of the stream of ink drops, and power supply means for forming an electric field intermediate said electrodes for deflecting the ink drops passing between said electrodes in accordance with the amplitudes of the individual charges on the ink drops;

a record receiving means for forming images indicative of the amplitude of the signals carried by the deflected ink drops;

carrier means mounting said nozzle, charging electrode and deflection electrodes and drive means for effecting relative movement between said record receiving medium and said carrier resulting in, if uncompensated for, an inclination of images formed by said ink drops;

the improvement comprising:

electromechanical transducer means connected to at least one of said deflection electrodes for altering its physical position to thereby alter the inclination of the electric field between said electrodes whereby character tilt may be compensated for regardless of the direction of relative movement between said carrier and said record receiving media.

2. In an ink jet printer in accordance with claim 1 wherein said deflection electrodes are mounted in spaced apart relation in a ring member, and means mounting said ring member on said carrier.

3. In an ink jet printer in accordance with claim 2 wherein the axis of rotation of said ring member is coaxial with said nozzle and said charge ring.

4. In an ink jet printer in accordance with claim 3 including frame means for mounting said electromechanical transducer means, and means coupling said electromechanical transducer means to said ring member.

5. In an ink jet printer in accordance with claim 2 including at least one ear on said ring member, and means connecting said electromechanical transducer means to said ear to effect rotation of said ring between first and second positions.

6. In an ink jet printer in accordance with claim 5 including a second electromechanical transducer means, and a second ear on said ring member, and means connecting said second electromechanical transducer means to said second ear.

7. In an ink jet printer in accordance with claim 6 wherein said electromechanical transducer means comprises solenoids.

8. In an ink jet printer in accordance with claim 7 wherein said ears project radially from said ring member.

9. An ink jet printer comprising:

a nozzle for emitting a stream of ink drops in a predetermined velocity in a predetermined path;

a charging electrode for charging ink drops in accordance with the signals to be recorded;

first and second spaced apart deflection electrodes on opposite sides of the path of the stream of ink drops, and ring means mounting said deflection electrodes for rotation between first and second positions, and power supply means for forming an electric field intermediate said electrodes for deflecting ink drops passing between said electrodes in accordance with the amplitudes of individual charges on the ink drops;

a record receiving means for forming images by said deflected ink drops, and carrier means mounting said nozzle, charging electrode and ring means mounting the deflection electrodes, and drive means for effecting relative movement between said record receiving medium and said carrier;

electromechanical transducer means connected to said ring means for altering its physical position to thereby alter the inclination of the electric field between said electrodes in a first direction corresponding to said first position of said ring and a second position corresponding to the second position of said ring whereby character tilt may be compensated for regardless of the direction of relative movement between said carrier and said record receiving media.

10. An ink jet printer in accordance with claim 9 wherein the axis of rotation of said ring member is coaxial with said nozzle and said charge ring.

11. In an ink jet printer in accordance with claim 10 including, frame means for mounting said electromechanical transducer means, and means coupling said electromechanical transducer means to said ring member.

12. In an ink jet printer in accordance with claim 10 including at least one ear on said ring member, and means connecting said electromechanical transducer means to said ear to effect rotation of said ring between first and second positions.

13. In an ink jet printer in accordance with claim 12 wherein including a second electromechanical transducer means, and a second ear on said ring member, and means connecting said second electromechanical transducer means to said second ear.

14. In an ink jet printer in accordance with claim 13 wherein said electromechanical transducer means comprises solenoids.

* * * * *